United States Patent
Cheng et al.

(10) Patent No.: US 10,265,844 B2
(45) Date of Patent: *Apr. 23, 2019

(54) CREATING ASSEMBLY PLANS BASED ON TRIGGERING EVENTS

(71) Applicant: International Business Machines Corporation, Armonk, NY (US)

(72) Inventors: Zhao Cheng, Markham (CA); Luyao Li, Markham (CA); Ramesh V. Raj, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/468,654

(22) Filed: Mar. 24, 2017

(65) Prior Publication Data

US 2018/0272527 A1  Sep. 27, 2018

(51) Int. Cl.
*B25J 9/00* (2006.01)
*B25J 11/00* (2006.01)
(Continued)

(52) U.S. Cl.
CPC .......... *B25J 9/0084* (2013.01); *A62C 27/00* (2013.01); *B25J 11/0025* (2013.01);
(Continued)

(58) Field of Classification Search
USPC ................................ 700/245–264
See application file for complete search history.

(56) References Cited

U.S. PATENT DOCUMENTS

| 4,608,525 | A | * | 8/1986 | Mori | ........................ B23Q 1/34 |
| | | | | | 700/248 |
| 5,084,826 | A | * | 1/1992 | Hariki | .............. G05B 19/41815 |
| | | | | | 700/248 |

(Continued)

FOREIGN PATENT DOCUMENTS

CN          201525026 U      7/2010

OTHER PUBLICATIONS

Cheng et al., "Self-Assembling Robotics for Disaster Applications", U.S. Appl. No. 15/705,656, filed Sep. 15, 2017, 31 pages.
(Continued)

*Primary Examiner* — Jonathan L Sample
(74) *Attorney, Agent, or Firm* — Christopher K. McLane

(57) ABSTRACT

In an approach to creating assembly plan for disaster mitigation, one or more computer processors identify one or more triggering events. The one or more computer processors receive one or more configuration parameters for one or more assembly plans pertaining to the one or more triggering events. The one or more computer processors analyze the one or more configuration parameters to determine necessary configuration parameters based upon the identified one or more triggering events. The one or more computer processors create the one or more assembly plans containing one or more instructions for one or more self-assembling robots based on the determined necessary configuration parameters. The one or more computer processors send the one or more assembly plans to one or more self-assembling robots.

20 Claims, 4 Drawing Sheets

(51) Int. Cl.
*F41H 13/00* (2006.01)
*A62C 27/00* (2006.01)
*G06Q 50/26* (2012.01)
*F41H 11/13* (2011.01)
*F41H 11/16* (2011.01)

(52) U.S. Cl.
CPC .............. *F41H 13/00* (2013.01); *F41H 11/13* (2013.01); *F41H 11/16* (2013.01); *G06Q 50/265* (2013.01)

(56) References Cited

U.S. PATENT DOCUMENTS

| | | | | |
|---|---|---|---|---|
| 5,963,712 A * | 10/1999 | Fujita | ............... | B25J 9/1615 318/568.12 |
| 6,266,577 B1 * | 7/2001 | Popp | ............... | B25J 9/163 700/245 |
| 6,324,443 B1 * | 11/2001 | Kurakake | ............... | B25J 9/1656 318/568.24 |
| 6,364,026 B1 * | 4/2002 | Doshay | ............... | A62C 3/0271 169/36 |
| 6,411,055 B1 * | 6/2002 | Fujita | ............... | B25J 9/1679 318/568.11 |
| 6,636,781 B1 * | 10/2003 | Shen | ............... | B08B 9/045 318/568.11 |
| 7,211,980 B1 * | 5/2007 | Bruemmer | ............... | G05D 1/0246 318/567 |
| 7,236,861 B2 * | 6/2007 | Paradis | ............... | F41H 13/00 701/120 |
| 7,467,026 B2 * | 12/2008 | Sakagami | ............... | B25J 9/1694 318/568.12 |
| 7,720,570 B2 * | 5/2010 | Close | ............... | B25J 9/1617 138/97 |
| 7,899,760 B2 * | 3/2011 | Hinchey | ............... | G06N 99/005 706/11 |
| 7,912,633 B1 * | 3/2011 | Dietsch | ............... | G01C 21/20 701/450 |
| 8,041,655 B2 * | 10/2011 | Hinchey | ............... | G06N 3/004 706/14 |
| 8,112,176 B2 | 2/2012 | Solomon | | |
| 8,131,839 B2 * | 3/2012 | Yu | ............... | G01D 21/00 370/252 |
| 8,138,868 B2 * | 3/2012 | Arnold | ............... | B81C 1/00007 335/219 |
| 8,200,700 B2 * | 6/2012 | Moore | ............... | G06F 17/30575 707/791 |
| 8,586,410 B2 * | 11/2013 | Arnold | ............... | H01L 24/95 257/E25.001 |
| 8,972,053 B2 * | 3/2015 | Bruemmer | ............... | G06K 9/00791 700/245 |
| 8,983,882 B2 | 3/2015 | Sterritt | | |
| 8,983,883 B2 * | 3/2015 | Sterritt | ............... | G05B 13/02 706/14 |
| 8,994,776 B2 * | 3/2015 | Sutherland | ............... | B25J 5/007 348/14.05 |
| 9,004,200 B2 * | 4/2015 | Ben-Tzvi | ............... | B62D 55/02 180/6.7 |
| 9,020,636 B2 * | 4/2015 | Tadayon | ............... | B25J 5/02 700/247 |
| 9,193,402 B2 * | 11/2015 | Chin | ............... | G05D 1/0246 |
| 9,222,205 B2 * | 12/2015 | Head | ............... | D04C 3/24 |
| 9,656,806 B2 * | 5/2017 | Brazeau | ............... | B65G 1/1378 |
| 9,751,207 B2 * | 9/2017 | Chin | ............... | G05D 1/0246 |
| 9,760,088 B2 * | 9/2017 | Baroudi | ............... | G05D 1/0287 |
| 9,821,455 B1 * | 11/2017 | Bareddy | ............... | B25J 9/0084 |
| 2003/0109958 A1 * | 6/2003 | Hogg | ............... | G06N 3/008 700/245 |
| 2003/0225479 A1 * | 12/2003 | Waled | ............... | B25J 9/161 700/245 |
| 2004/0024490 A1 * | 2/2004 | McLurkin | ............... | G05D 1/0297 700/245 |
| 2004/0162638 A1 * | 8/2004 | Solomon | ............... | F41H 13/00 700/247 |
| 2005/0065652 A1 * | 3/2005 | Sakagami | ............... | B25J 9/1694 700/245 |
| 2005/0113974 A1 * | 5/2005 | Doi | ............... | B25J 5/00 700/245 |
| 2006/0041332 A1 * | 2/2006 | Sabe | ............... | G06N 3/008 700/245 |
| 2006/0079997 A1 * | 4/2006 | McLurkin | ............... | G05D 1/0297 700/245 |
| 2007/0031217 A1 * | 2/2007 | Sharma | ............... | B25J 5/007 414/222.08 |
| 2007/0061040 A1 * | 3/2007 | Augenbraun | ............... | A47L 5/225 700/245 |
| 2007/0061043 A1 * | 3/2007 | Ermakov | ............... | A47L 5/225 700/263 |
| 2007/0061487 A1 * | 3/2007 | Moore | ............... | G06F 17/30575 709/246 |
| 2007/0179669 A1 * | 8/2007 | McLurkin | ............... | G05D 1/0297 700/245 |
| 2007/0208442 A1 * | 9/2007 | Perrone | ............... | G05D 1/0088 700/95 |
| 2007/0250212 A1 * | 10/2007 | Halloran | ............... | A47L 5/30 700/245 |
| 2007/0271002 A1 * | 11/2007 | Hoskinson | ............... | G06Q 10/06 700/245 |
| 2008/0009967 A1 * | 1/2008 | Bruemmer | ............... | G05D 1/0088 700/245 |
| 2008/0009968 A1 * | 1/2008 | Bruemmer | ............... | G06N 3/008 700/245 |
| 2008/0009969 A1 * | 1/2008 | Bruemmer | ............... | G06N 3/008 700/245 |
| 2008/0009970 A1 * | 1/2008 | Bruemmer | ............... | G05D 1/0088 700/245 |
| 2008/0097644 A1 * | 4/2008 | Kaznov | ............... | A63H 11/00 700/245 |
| 2008/0109115 A1 * | 5/2008 | Lim | ............... | B62D 57/032 700/258 |
| 2008/0161970 A1 * | 7/2008 | Adachi | ............... | B25J 9/0003 700/253 |
| 2008/0269948 A1 * | 10/2008 | Solomon | ............... | A61B 5/416 700/245 |
| 2009/0105879 A1 * | 4/2009 | Ng-Thow-Hing | ............... | B25J 9/1656 700/245 |
| 2009/0234788 A1 * | 9/2009 | Kwok | ............... | G06N 3/006 706/46 |
| 2009/0248200 A1 * | 10/2009 | Root | ............... | B25J 9/1689 700/245 |
| 2009/0306823 A1 * | 12/2009 | Baltes | ............... | G05D 1/0274 700/245 |
| 2010/0094459 A1 * | 4/2010 | Cho | ............... | G05D 1/0291 700/248 |
| 2010/0145509 A1 * | 6/2010 | Zhang | ............... | B25J 9/1687 700/245 |
| 2010/0211204 A1 * | 8/2010 | Zhang | ............... | B25J 9/1687 700/104 |
| 2011/0071679 A1 * | 3/2011 | Barajas | ............... | B25J 9/1674 700/259 |
| 2011/0135189 A1 * | 6/2011 | Lee | ............... | B25J 9/1682 382/153 |
| 2011/0232925 A1 * | 9/2011 | Al-Azemi | ............... | A62C 27/00 169/52 |
| 2013/0080360 A1 * | 3/2013 | Sterritt | ............... | G05B 13/02 706/14 |
| 2013/0123981 A1 * | 5/2013 | Lee | ............... | H04W 4/02 700/248 |
| 2013/0218346 A1 * | 8/2013 | Root | ............... | B25J 9/1689 700/264 |
| 2014/0142750 A1 * | 5/2014 | Ahn | ............... | B25J 9/00 700/245 |
| 2015/0190925 A1 * | 7/2015 | Hoffman | ............... | B25J 9/161 700/257 |
| 2015/0190927 A1 * | 7/2015 | Sutherland | ............... | H04W 4/70 700/259 |
| 2015/0217453 A1 * | 8/2015 | Zhang | ............... | B25J 9/1687 700/105 |
| 2016/0031081 A1 * | 2/2016 | Johnson | ............... | B25J 9/1656 700/250 |

(56) References Cited

U.S. PATENT DOCUMENTS

| | | | | |
|---|---|---|---|---|
| 2016/0067864 | A1* | 3/2016 | Mullan | B25J 9/1605 700/19 |
| 2016/0082298 | A1* | 3/2016 | Dagenhart | A62C 3/025 169/46 |
| 2016/0221186 | A1* | 8/2016 | Perrone | B25J 9/1661 |
| 2016/0325127 | A1* | 11/2016 | Billman | A62C 3/0285 |
| 2016/0375592 | A1* | 12/2016 | Szatmary | B25J 5/00 700/255 |
| 2017/0057081 | A1* | 3/2017 | Krohne | B25J 9/0084 |
| 2017/0088205 | A1* | 3/2017 | Karras | B62D 57/02 |
| 2017/0128759 | A1* | 5/2017 | Zonio | A62C 31/00 |

OTHER PUBLICATIONS

Appendix P, List of IBM Patents or Patent Applications Treated As Related, 2 pages, dated Sep. 18, 2017.

Kuntze et al., "SENEKA—Sensor Network with Mobile Robots for Disaster Management", 2012 IEEE Conference on Technologies for Homeland Security (HST), © 2012 IEEE, DOI: 10.1109/THS.2012. 6459883, <http://ieeexplore.ieee.org/stamp/stamp.jsp?tp=8,arnumber=6459883>, 6 pages.

Sebestyénová et al.,"Simulation of Self-organizing Multi-Robotic System used for Area Coverage and Surround of Found Targets", WSEAS Transactions on Information Science and Applications, Institute of Informatics, Slovak Academy of Sciences, 845 07 Bratislava, Dúbravskácesta 9,Slovakia, vol. 11, 2014, pp. 130-138,E-ISSN: 2224-3402.

Witkowski et al., "Self-Optimizing Human-Robot Systems for Search and Rescue in Disaster Scenarios", Jan. 2008, Conference: Proceedings of the 7th International Heinz Nixdorf Symposium, 14 pages.

"Aerodynamic Vehicle with Self Assembling Robots", an IP.com Prior Art Database Technical Disclosure, Authors et. al: Disclosed Anonymously, IP.com Number: IPCOM000248129D, IP.com Electronic Publication Date: Oct. 28, 2016, 3 pages.

"Cubelets! Thousands & Thousands of Tiny Robots", by modrobotics,YouTube, Uploaded on Dec. 24, 2011, Cubelets made by Modular Robotics in Boulder, Colorado, USA, <https://www.youtube.com/watch?v=4EDsLayRKQA>, 4 pages.

"Firebreak", From Wikipedia, the free encyclopedia, This page was last modified on Dec. 26, 2016, 2 pages, <https://en.wikipedia.org/wiki/Firebreak>.

"Managing Oil Spills using Self-Assembling Robots", an IP.com Prior Art Database Technical Disclosure, Authors et. al.: Disclosed Anonymously, IP.com No. IPCOM000247879D, IP.com Electronic Publication Date: Oct. 9, 2016, 3 pages.

"Roombots—Modular robotics for adaptive and self-organizing furniture", École polytechnique fédérale de Lausanne EPFL, Biorobotics Laboratory BIOROB, <http://biorob.epfl.ch/cms/page-36376.html>, 8 pages.

"Small cubes that self-assemble", Massachusetts Institute of Technology (MIT), Published on Oct 3, 2013, 6 pages, <https://www.youtube.com/watch?v=6aZbJS6LZbs>.

* cited by examiner

CREATING ASSEMBLY PLANS BASED ON TRIGGERING EVENTS

BACKGROUND OF THE INVENTION

The present invention relates generally to the field of robotics, and more particularly to self-assembling robotics for the mitigation of disaster circumstances.

Robotics is the interdisciplinary branch of engineering and science that includes mechanical engineering, electrical engineering, computer science, and others. Robotics deals with the design, construction, operation, and use of robots, as well as computer systems for their control, sensory feedback, and information processing.

These technologies are used to develop machines that can substitute for humans. Robots can be used in many situations and for many purposes, but today many are used in dangerous environments, such as in bomb detection and de-activation, manufacturing processes, or where the threat to human lives are great. Robots can take on many forms based on the application.

SUMMARY

Embodiments of the present invention disclose a method, a computer program product, and a system for creating assembly plans for disaster mitigation. The method may include one or more computer processors identifying one or more triggering events. The one or more computer processors receive one or more configuration parameters for one or more assembly plans pertaining to one or more triggering events. The one or more computer processors analyze the one or more configuration parameters to determine necessary configuration parameters based upon the identified one or more triggering events. The one or more computer processors create the one or more assembly plans containing one or more instructions for one or more self-assembling robots based on the determined necessary configuration parameters. The one or more computer processors send the one or more assembly plans to one or more self-assembling robots.

DETAILED DESCRIPTION

Present day methods of disaster response put first responders at significant risk of injury. Though improvements to the disaster response systems have benefitted from the use of robots, many of the robots, such as drones, require substantial human effort to operate correctly. For example, present day disaster response robots may require first responders to set up equipment in dangerous areas which forces first responders to drop into or close to disaster zones. As such, self-assembling robots adapted for disaster response can substantially increase the safety and effectiveness of first responders. Applying self-assembling robots allows first responders to avoid disaster zones and complicating factors, such as dangerous terrain, weather, and inadequate manpower. Further, self-assembling robots open up possibilities in how disasters can be managed. For example, self-assembling robots equipped with internal tanks of fire retardant may be used to create an improved version of conventional fire breaks while simultaneously requiring less manpower in fire mitigation strategies. Embodiments of the present invention recognize that self-assembling robots can complement present day disaster response methods by reducing the need for manpower and the danger involved in conventional disaster response techniques. Implementation of embodiments of the invention may take a variety of forms, and exemplary implementation details are discussed subsequently with reference to the Figures.

Figure 1:
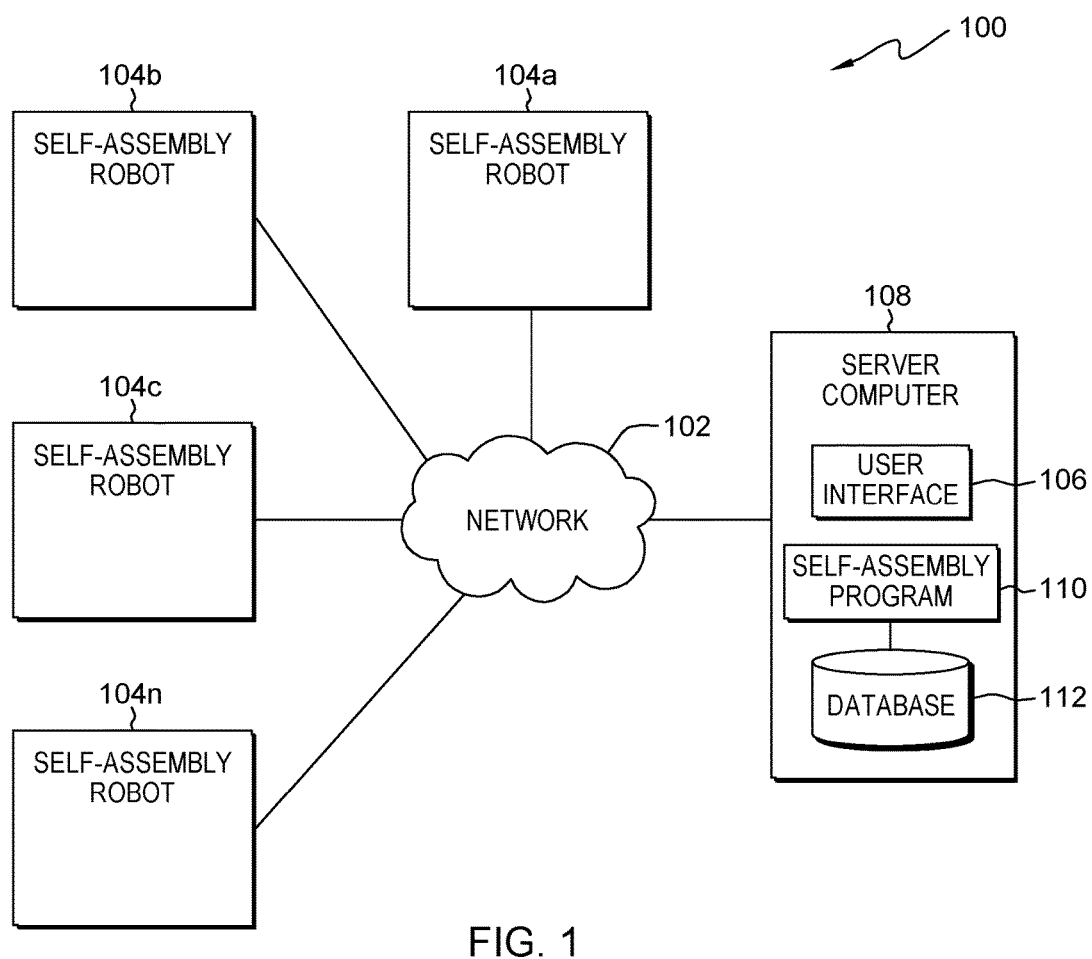
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes self-assembling robot 104a, self-assembling robot 104b, self-assembling robot 104c, self-assembling robot 104n, and server computer 108, all interconnected over network 102. References to self-assembling robots 104 in this application will refer to self-assembling robot 104a, self-assembling robot 104b, self-assembling robot 104c, and self-assembling robot 104n. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between self-assembling robots 104 and server computer 108, and other computing devices (not shown) within distributed data processing environment 100.

Self-assembling robots 104 can be any programmable electronic device capable of communicating with various components and devices within distributed data processing environment 100 via network 102 and assembling with other self-assembling robots to create structures. Self-assembling robot 104n represents any number of robots. As such, there may be any number of robots between self-assembling robot 104a and self-assembling robot 104n. The structures may be specific to the task at hand. For example, self-assembling robots 104 may consist of 300 larger robots containing fire retardant and 600 regular robots to create a fire break as part of a fire mitigation strategy with one in every three robots dispensing additional fire-fighting chemicals. Self-assembling robots 104 may move in any way applicable to the task. For example, self-assembling robots 104 may be capable of moving around objects, over objects, and flying over and through objects. Self-assembling robots 104 may receive direct input from the user via user interface 106 on server 108. Self-assembling robots 104 may represent any programmable electronic device, pre-configured electronic device, or combination of programmable and pre-configured electronic devices capable of executing machine readable program instructions and communicating with other computing devices (not shown) within distributed data processing environment 100 via a network, such as network 102. Further, one or more self-assembling robots 104 may independently analyze data, such as wind conditions, global positioning coordinates, and terrain conditions, and employ self-learning or machine learning techniques to make operational decisions dynamically. In an embodiment, self-assembling robots 104 may be limited to communicating with other computing devices (not shown) within distributed data processing environment 100 via a network, such as network 102. In another embodiment, self-assembling robots 104 may include instances of user interface 106. In yet another embodiment, server computer 108 may include an instance of user interface 106. Self-assembling robots 104 may take any variety of one or more forms based on the one or more self-assembling robots 104 respective tasks. For example, self-assembling robots 104 can be cube-shaped, triangular prisms, hexagonal prisms, and spherical.

User interface 106 provides an interface to self-assembly program 110 on server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of self-assembly robots 104 and server computer 108. Mobile application software, or an "app," is a computer program designed to run on smart phones, tablet computers and other mobile devices. User interface 106 enables the user of self-assembly robots 104 to register with and configure self-assembly program 110 to adjust preferences for disaster response strategies, such as the type of disaster and the method employed to address the disaster. However, user interface 106 is not limited to the aforementioned examples and may be used to control any parameters associated with self-assembly program 110.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with self-assembling robots 104 and other computing devices (not shown) within distributed data processing environment 100 via network 102. For example, server computer 108 may be a smart phone that is capable of remotely controlling and sending registration and configuration data to self-assembling robots 104. In another embodiment, server computer 108 may send updated data, such as wind conditions, temperature, locations of people, and terrain conditions. In yet another embodiment, server computer 108 represents a computing system utilizing clustered computers and components (e.g., database server computers, application server computers, etc.) that act as a single pool of seamless resources when accessed within distributed data processing environment 100. Server computer 108 includes self-assembly program 110 and database 112. Server computer 108 may include internal and external hardware components, as depicted and described in further detail with respect to FIG. 4.

Self-assembly program 110 executes a series of steps to create one or more assembly plans using configuration parameters, such as global positioning coordinates, robot data, and task data, and send the one or more assembly plans to one or more self-assembling robots 104 and verify the correct assembly of the one or more self-assembling robots 104. Self-assembly program 110 aims to streamline and automate much of the management of assembly plans required to reduce manual inputs or human-assisted assembly of the one or more self-assembling robots 104. Further self-assembly program 110 aims to keep first responders safe by eliminating the need for a human operator to be in close proximity to the disaster area. For example, self-assembly program 110 may save a first responder time and effort in having to assess the particular details of a disaster area, such as topography and disaster-specific logistics, and having to physically set up one or more disaster mitigation measures. By allowing a human operator to minimize direct involvement in the disaster mitigation measures, self-assembly program 110 may also reduce the danger associated with disaster zones. For example, a first responder may use self-assembly program 110 to enable the dropping of self-assembling robots in a forest fire zone by instructing the self-assembling robots 104 to function autonomously after the first responder sends configuration parameters to self-assembly program 110. In another embodiment, self-assembly program 110 may identify and create one or more assembly plans for fire mitigation strategies such as building fire breaks in optimal locations to protect life and infrastructure. For example, self-assembly program 110 may analyze current data such as wind speed to alter the assembly plan to achieve an optimal fire break. In yet another embodiment, self-assembly program 110 may receive real time data from sensors located on one or more self-assembling robots 104.

To achieve the aforementioned functions, in some embodiments, self-assembly program 110 receives configuration parameters. Configuration parameters may include any data associated with one or more self-assembling robots 104 and the one or more self-assembling robots 104 roles in disaster mitigation. In an embodiment, configuration parameters may include global positioning coordinates, task data, and self-assembling robots 104 data. For example, global positioning coordinates may be used to indicate a forest fire zone and determine the forest fire zone's accompanying factors, such as topography, wind speed, and weather forecasts. Task data may be used to create a disaster mitigation strategy based on the task-specific factors, such as a redirection of the fire away from residential areas, an updated method of slowing fire expansion, and the number of self-assembling robots 104 available for deployment. Task data may include any data associated with the particular disaster mitigation strategy at hand and is not limited to the embodiments contained herein. In one example, task data may be adjusted to address different priorities in disaster mitigation in separate situations despite addressing the same type of disaster. In another example, task data may address different types of disasters, such as building emergency shelters and fire disaster mitigation, but prioritize the same goal of protecting human life over avoiding severe infrastructure damage. Additionally, robot data, such as self-assembling robots 104 data, may be used to determine the disaster mitigation strategy given the amount and types of self-assembling robots 104 available and the particular capabilities of the one or more types of self-assembling robots 104.

In various embodiments, self-assembly program 110 analyzes the one or more configuration parameters. For example, self-assembly program 110 may use global positioning coordinates, task data, and self-assembling robots 104 data to consider to compile data for the creation of a disaster mitigation plan. After analyzing the data associated with the one or more configuration parameters, self-assembly program 110 creates one or more assembly plans to carry out a disaster mitigation plan in response to a triggering event. For example, self-assembly program 110 may create a set of one or more program instructions to be sent to self-assembling robots 104 in response to a disaster. Self-assembly program 110 sends the one or more assembly plans to one or more self-assembling robots 104. Self-assembly program 110 verifies that the one or more self-assembly robots 104 correctly received the one or more assembly plans. Each of the one or more self-assembly robots 104 may have a different assembly plan depending on the one or more self-assembly robots 104 role in disaster mitigation. For example, self-assembly program 110 may wait to receive signals from the one or more self-assembling robots 104 verifying receipt of the one or more program instructions. Self-assembly program 110 determines whether the one or more self-assembly robots 104 are assembled in the correct configuration. For example, self-assembly program 110 may receive verification that each of the one or more self-assembling robots have successfully executed the one or more program instructions. In another example, self-assembly program 110 may receive one or more signals indicating that one or more self-assembling robots 104 have not achieved the program instructions. If self-assembly program 110 determines that the one or more self-assembling robots 104 have not correctly carried out the one or more program instructions, then self-assembly program 110 creates or modifies one or more assembly plans. If self-assembly program 110 determines that the one or more self-assembling robots 104 have correctly carried out the one or more program instructions, then self-assembly program 110 ends.

Database 112 is a repository for data used by self-assembly program 110. In the depicted embodiment, database 112 resides on server computer 108. In another embodiment, database 112 may reside elsewhere within distributed data processing environment 100 provided self-assembly program 110 has access to database 112. Database 112 can be implemented with any type of storage device capable of storing data and configuration files that can be accessed and utilized by server computer 108, such as a database server, a hard disk drive, or a flash memory. In some embodiments, database 112 may store any data that self-assembly program 110 uses to store and locate component data. For example, database 112 may store parameters set by a user that give self-assembly program 110 permission to execute particular disaster mitigation measures autonomously. In various embodiments, database 112 may store data received by self-assembly program 110 and registration information including configuration data of self-assembly program 110 and self-assembling robots 104. Examples of registration data include, but are not limited to, data identifying user preferences for which disaster mitigation protocols and self-assembling robots 104 that self-assembly program 110 may access. For example, a user may input user preferences that do not allow self-assembly program 110 to access particular self-assembling robots 104 used for specialized disaster situations and particular disaster mitigation measures that require human authorization. However, the aforementioned examples serve to illustrate a few scenarios, and the user preferences can be in the form of any restrictions and allowances a user may input.

Figure 2:
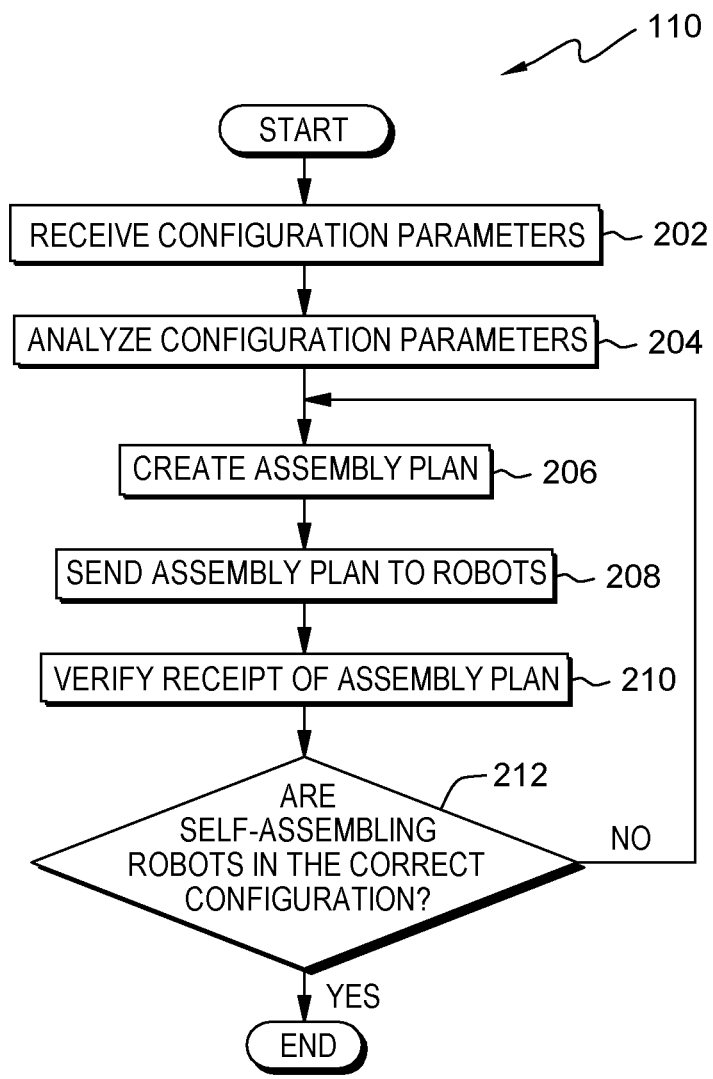
FIG. 2 is a flowchart depicting operational steps of a self-assembly program, on a server computer within the distributed data processing environment of FIG. 1, for managing self-assembling robots, in accordance with an embodiment of the present invention.

FIG. 2 depicts operational steps for creating assembly plans for disaster mitigation, on a computing device within the computing environment of FIG. 1, in accordance with an embodiment of the present invention. FIG. 2 is a flowchart depicting operations of an instance of self-assembly program 110 on server computer 108 within distributed data processing environment 100. The operational steps of FIG. 2 begin when self-assembly program 110 receives configuration parameters. FIG. 2 as described herein is based on the operational steps of self-assembly program 110 located outside of self-assembling robots 104. However, alternative embodiments and configurations may execute the operational steps of self-assembly program 110 within self-assembling robots 104.

Self-assembly program 110 receives configuration parameters (step 202). Configuration parameters may include any data associated with one or more self-assembling robots 104 and the one or more self-assembling robots 104 role in disaster mitigation. In an embodiment, configuration parameters may include global positioning coordinates, task data, and self-assembling robots 104 data. For example, global positioning coordinates may indicate a forest fire zone and determine the forest fire zone's accompanying factors, such as topography, wind speed, and weather forecasts. Self-assembly program 110 may create a disaster mitigation strategy based on the task-specific factors surrounding a triggering event, such as a redirection of the fire away from residential areas, an optimal method of slowing fire expansion, and the number of self-assembling robots 104 available for deployment, using task data. In another embodiment, self-assembly program 110 may receive a disaster mitigation strategy from one or more users, such as a disaster relief organization or first responders. A triggering event may include the type of disaster, the timing of the disaster, the location of a disaster, and the point in time where a user of self-assembly program 110 initiates disaster mitigation protocols. For example, self-assembly program 110 may receive configuration parameters, such as topography, wind speed, and weather forecasts, associated with a triggering event, such as a fire in a particular mountain town on Christmas day. However, triggering events are not limited to the aforementioned embodiments and may be any disaster triggering a disaster mitigation protocol. Lastly, self-assembly program 110 may use self-assembling robots 104 data to determine the options given the amount and types of self-assembling robots 104 available and the particular capabilities of the one or more types of self-assembling robots 104. However, configuration parameters are not limited to the aforementioned embodiments and may include any parameters associated with disaster mitigation.

Self-assembly program 110 analyzes the one or more configuration parameters (step 204). Self-assembly program 110 analyzes the one or more configuration parameters and data associated with the configuration parameters to create a general disaster mitigation plan in response to a triggering event. In an embodiment, self-assembly program 110 analyzes the one or more configuration parameters to create one or more fire mitigation plans. For example, self-assembly program 110 may use the global positioning coordinates indicating a fire zone will spread at a rate of 10 acres per hour based on the fire zone topography, wind speeds, humidity, and chance of precipitation to create a plan to create 100-feet-long firebreaks one mile from the border of the fire zone.

In yet another embodiment, self-assembly program 110 analyzes the one or more configuration parameters to create one or more shelter-based disaster mitigation plans to handle the construction of emergency shelters. For example, self-assembly program 110 may use the global positioning data indicating the square footage of viable construction space, the task data indicating the number of individuals needing shelter, such as fire fighters, and self-assembling robots 104 data indicating the number of self-assembling robots 104 available for the task to determine how many shelters to optimally construct given the configuration parameters. Further illustrating this example, self-assembly program 110 may determine that the required shelter space is 300 square feet for thirty fire fighters needing ten square feet of shelter each and the number and types of self-assembly robots 104 available can create one or more viable configurations. As a result, self-assembly program 110 creates one or more tailored assembly plans based on the task data.

In yet another embodiment, self-assembly program 110 analyzes the one or more configuration parameters to create one or more disaster mitigation plans to protect one or more objects or one or more individuals from objects moving at a high-velocity. For example, self-assembly program 110 may use the self-assembling robots 104 data and task data to determine that a six-foot-tall and thirty-foot-long barrier will adequately protect 30 construction workers from debris projected from a demolition of a building. Further illustrating this example, self-assembly program 110 may determine that the required shelter space is 300 square feet for thirty construction workers needing ten square feet of shelter each, barriers must be two feet thick to baffle any projected construction materials, and the number and types of self-assembly robots 104 available can create one or more viable configurations. As a result, self-assembly program 110 creates one or more tailored assembly plans based on the task data.

After analyzing the data associated with the one or more configuration parameters, self-assembly program 110 creates one or more assembly plans to carry out an optimal disaster mitigation plan in response to a triggering event (step 206). By analyzing data associated with the one or more configuration parameters, self-assembly program 110 may determine an optimal disaster plan. An optimal disaster plan can be determined by standard disaster mitigation protocols, such as protocols set by disaster relief organization or first responders, algorithm-based protocols, or a combination of both standard disaster mitigation protocols and algorithm-based protocols. For example, self-assembly program 110 may use an algorithm-based protocol to determine an optimal disaster mitigation plan by calculating the best possible options to achieve the suppression of a forest fire given the existing terrain, wind speed, humidity, weather forecast, and task data. In an embodiment, self-assembly program 110 creates an assembly plan by translating one or more disaster mitigation plans into executable program instructions which are sent to self-assembling robots 104. For example, self-assembly program 110 may create program instructions which instruct cube-shaped self-assembling robots 104 to connect together in a configuration that is ten feet wide, 100 feet long, and two feet tall for the purpose of creating a firebreak.

In another embodiment, self-assembly program 110 may create program instructions to be sent to subsets of self-assembling robots 104 based on the self-assembling robots 104 particular capabilities. For example, self-assembly program 110 may create an assembly plan based on standard disaster mitigation protocols, such as a state sponsored manual that explains proper firebreak practices for particular terrains. The assembly plan assigns self-assembling robots 104 with simple barrier functionality to create a framework for a firebreak and intersperses self-assembling robots 104 with fire extinguishing capabilities within the barrier in regularly spaced intervals. In another embodiment, self-assembly program 110 may create program instructions based on self-assembling robot 104 functionality and prevailing disaster circumstances. For example, self-assembly program 110 may create assembly plans that instruct self-assembling robots 104 with fire extinguishing capabilities to assemble in specific areas in a barrier based on proximity to a forest fire and instruct self-assembling robots 104 with barrier functions to amass to create a thicker barrier near threatened housing developments.

In yet another example, self-assembly program 110 may create program instructions that instruct self-assembling robots 104 into one or more lattice-like structures to create frames for quickly building emergency structures. For example, self-assembly program 110 may create program instructions for self-assembling robots 104 in triangular prism-shaped configurations to occupy the corners of an emergency structure and self-assembling robots 104 in cube-shaped configurations to fill in the space between two triangular prism-shaped self-assembling robots 104. Further, self-assembly program 110 may create program instructions that instruct self-assembling robots 104 to reduce the number of cube-shaped self-assembling robots 104 by one self-assembling robot 104 between the triangular prism-shaped self-assembling robots 104 in each additional layer above the base layer. As a result, self-assembling robots 104 create a dome-shaped hexagonal emergency structure.

In a related example, self-assembly program 110 may create program instructions that instruct self-assembling robots 104 made of a tougher material to sit on top of self-assembling robots 104 made of softer materials and shaped in configurations maximizing even weight distribution and grip on uneven surfaces. As a result, self-assembling robots 104 may create structures facilitating human movement, such as a stair-like structure down dangerous inclined faces to facilitate the movement of firefighters and emergency professionals or a flat durable structure allowing a helicopter to safely land in a mountainous region.

Self-assembly program 110 sends the one or more assembly plans to one or more self-assembling robots 104 (step 208). In an embodiment, a user of self-assembly program 110 may send one or more self-assembling robots 104 one or more sets of program instructions over network 102. In another embodiment, self-assembly program 110 may send one or more sets of program instructions to one or more types of self-assembling robots. For example, self-assembly program 110 may send instructions for a cube-shaped self-assembling robot 104 to connect at two opposite faces and send instructions to a triangular prism-shaped self-assembling robot 104 to connect at two adjacent lateral faces (i.e., the rectangular sides of a triangular prism) in order to achieve an octagonal structure comprising four cub-shaped self-assembling robots 104 and four triangular prism-shaped self-assembling robots 104. In yet another embodiment, self-assembly program 110 may communicate with a smaller portion of self-assembling robots 104 which, in turn, propagate the signal locally among the remaining self-assembling robots 104 using wireless communication, such as near field communications technology.

Self-assembly program 110 verifies that the one or more self-assembly robots 104 correctly received the one or more assembly plans (step 210). In an embodiment, self-assembly program 110 receives a signal from one or more self-assembling robots 104 indicating that the one or more self-assembling robots 104 successfully received the one or more assembly plans without error via network 102. In yet another embodiment, self-assembly program 110 may verify that the one or more self-assembly robots 104 received the program instructions by receiving a signal from one or more self-assembly robots 104 indicating one or more unsuccessful deliveries of the one or more assembly plans via network 102. In alternative embodiments, self-assembly program 110 may not verify that the one or more self-assembly robots 104 received the one or more assembly plans and may directly proceed to determining whether the one or more self-assembling robots 104 are assembled in the correct configuration (decision block 212).

Self-assembly program 110 determines whether the one or more self-assembling robots 104 are assembled in the correct configuration (decision block 212). In an embodiment, self-assembly program 110 may receive one or more signals from one or more self-assembling robots 104 indicating the faces of the robot that are interconnected with other self-assembling robots 104. Self-assembly program 110 may determine that the self-assembling robots 104 have achieved the correct configuration. For example, self-assembly program 110 may receive one or more signals from four cube-shaped self-assembling robot 104 verifying a connection at two opposite faces and receive one or more signals from four triangular prism-shaped self-assembling robot 104 verifying a connection at two adjacent lateral faces (i.e., the rectangular sides of a triangular prism). As a result, self-assembly program 110 may come to the conclusion that the one or more self-assembling robots 104 achieved a desired octagonal shape. In another embodiment, the determination of whether the one or more self-assembling robots 104 are assembled in the correct configuration may be a threshold inquiry. The threshold may be set by a user of self-assembly program 110, limited by a minimum required structural integrity, or set by algorithms based on the task data. For example, ninety percent of the one or more self-assembling robots assembled correctly may be determined to be sufficient to constitute a correct configuration. In yet another embodiment, self-assembly program 110 may determine whether the one or more self-assembling robots 104 are assembled in the correct configuration based on standardized disaster mitigation protocols or best practices regarding the type of disaster mitigation executed, such as fire disaster mitigation protocols and shelter-based disaster mitigation protocols. For example, self-assembly program 110 may use a government issued firefighting protocol to determine whether the one or more self-assembling robots 104 are assembled correctly by being in accordance with the fire disaster mitigation protocols of a state.

Responsive to self-assembly program 110 determining that the one or more self-assembling robots 104 have not correctly carried out the one or more program instructions ("No" branch, decision block 212), self-assembly program 110 creates or modifies one or more assembly plans (step 206). In an embodiment, self-assembly program 110 may resend an existing set of program instructions associated with one or more assembly plans to send out to the one or more self-assembling robots 104 that failed to achieve the correct configuration. For example, if one self-assembling robot 104 failed to connect to the correct adjacent one or more self-assembling robots 104, then self-assembly program 110 may resend the same assembly plan to the one self-assembling robot 104 that failed to achieve the correct configuration. In another embodiment, self-assembly program 110 may modify the one or more program instructions associated with one or more assembly plans to send out to one or more self-assembling robots that failed to achieve the correct configuration. For example, if partial set one or more self-assembling robots 104 fail to achieve the correct configuration, self-assembly program 110 may choose to modify the assembly plan to relocate the partial set of one or more self-assembling robots 104 that failed to achieve the correct configuration to an alternative structural configuration. In another example, if one or more self-assembling robots 104 are damaged or receive damage, then self-assembly program 110 may choose to modify the assembly plan to an alternative structural configuration.

In yet another embodiment, self-assembly program 110 may modify the entire set of one or more program instructions associated with one or more assembly plans and send the modified program instructions to each of the one or more self-assembling robots 104. For example, if self-assembly program 110 determines that the failure of one or more self-assembling robots 104 creates a significant weakness in the structural integrity of the overall structure, then self-assembly program 110 may create a new set of one or more program instructions to send to each of the one or more self-assembling robots 104. In yet another embodiment, self-assembly program 110 may create an entirely new set of one or more program instructions associated with one or more assembly plans and send the new set of one or more program instructions to each of the one or more self-assembling robots 104. For example, if self-assembly program 110 determines that an increase in wind speed based on global positioning data will occur in a fire-based application, then self-assembly program 110 may create a new set of program instructions that increases the size of the firebreak to address the changed conditions.

If self-assembly program 110 determines that the one or more self-assembling robots 104 have correctly carried out the one or more program instructions ("Yes" branch, decision block 212), then self-assembly program 110 ends.

Figure 3A:
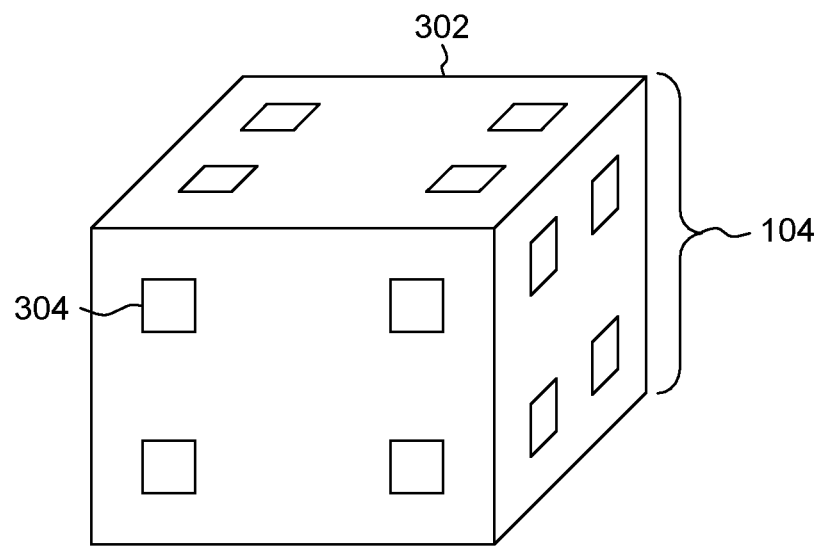
FIG. 3A depicts the external structure of one embodiment of a self-assembling robot.

FIG. 3A depicts the external components of one embodiment of self-assembling robots 104. Self-assembling robot 104 may include robot exterior 302 and attachment mechanism 304.

FIG. 3A depicts the exterior surface of one embodiment of self-assembling robot 104, in accordance with an embodiment of the present invention. It should be appreciated that FIG. 3A provides only an illustration of one implementation and does not imply any limitations with regard to the different embodiments that can be implemented. Many modifications to the depicted embodiment can be made.

Robot exterior 302 can be made of any material relevant to any application of self-assembling robot 104. In an embodiment, robot exterior 302 may be a fire-resistant material. For example, in a fire-disaster application of self-assembling robot 104, robot exterior 302 may be made of a fire-resistant material such as concrete. In yet another embodiment, robot exterior 302 may be a material for structural applications. For example, in a construction application of self-assembling robot 104, robot exterior 302 may be made of a material suited for construction such as steel and wood. In yet another embodiment, robot exterior 302 may be a structural frame rather than a structure defining an interior space. For example, robot exterior 302 may be a cube shaped structure with solid material present where the edges of the faces meet. However, robot exterior 302 may be made of any material and be in any form relevant to the application of self-assembling robot 104.

Attachment mechanism 304 can be any mechanism relevant to any application of self-assembling robot 104. In an embodiment, attachment mechanism 304 may be magnetic. For example, attachment mechanism 304 may be constructed from a ferromagnetic material that can attached to other ferromagnetic attachment mechanisms 304 when an electrical current is applied. In another example, attachment mechanism 304 may be constructed from a magnetic material that can passively attach to other magnetic attachment mechanisms. In another embodiment, attachment mechanism 304 may be a physical attachment. For example, attachment mechanism 304 may have one or more insertion mechanisms and one or more receiving mechanisms that can physically connect adjacent attachment mechanisms 304. In yet another embodiment, attachment mechanism 304 may a suction-based mechanism that uses negative air pressure to connected one or more self-assembling robots 104.

Figure 3B:
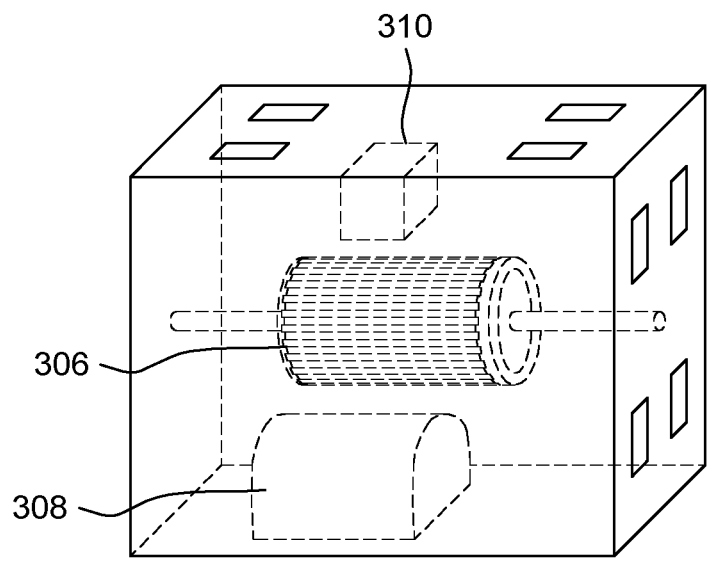
FIG. 3B depicts the internal structure of one embodiment of a self-assembling robot.

FIG. 3B depicts the internal components of one embodiment of self-assembling robot 104. Self-assembling robot 104 may include movement mechanism 306, storage mechanism 308, and communication mechanism 310.

FIG. 3B depicts the internal components of self-assembling robot 104, in accordance with one embodiment of the present invention. It should be appreciated that FIG. 3B provides only an illustration of one implementation and does not imply any limitations with regard to the different embodiments that can be implemented. Many modifications to the depicted embodiment can be made.

Movement mechanism 306 may be any mechanism by which self-assembling robot 104 can move. In one embodiment, movement mechanism 306 may be one or more rotating motors that transfer rotational energy to self-assembling robot 104 as a whole, thereby allowing self-assembling robot to move by rotation. In another embodiment, movement mechanism 306 may be one or more wheels on the external surface of self-assembling robot 104 attached to motors. In yet another embodiment, movement mechanism 306 may be one or more motors attached to the robot exterior that can rotate the external surface of two halves of self-assembling robot 104 along one or more axis to facilitate movement.

Storage mechanism 308 may be any internal or external structure for the delivery of one or more materials via self-assembling robot 104. In one embodiment, storage mechanism 308 may be one or more internal capsules containing a fire-suppressing substance. For example, in a fire-disaster application, storage mechanism 308 may contain potassium nitrate for release once self-assembling robot 104 reaches the fire zone and achieves the correct configuration. In another embodiment, storage mechanism 308 may be one or more internal capsules containing an expanding buoyant substance. For example, in a water disaster-based mitigation plan, storage mechanism 308 may contain an expanding polyurethane foam solution to be released once self-assembling robot 104 reaches a shipwreck to quickly create buoyant rafts for stranded survivors.

Communication mechanism 310 may be any mechanism for communication over network 102 between self-assembling robots 104, between self-assembling robots 104 and self-assembly program 110, and any other communication with any other device relevant to the task at hand. In one embodiment, communication mechanism 310 may use a cellular network. In another embodiment, communication mechanism 310 may use a local radio frequency channel to communicate with devices within close proximity to one or more self-assembling robots 104. In another embodiment, communication mechanism 310 may use a global positioning system to communication coordinates to self-assembly program 110.

Figure 4:
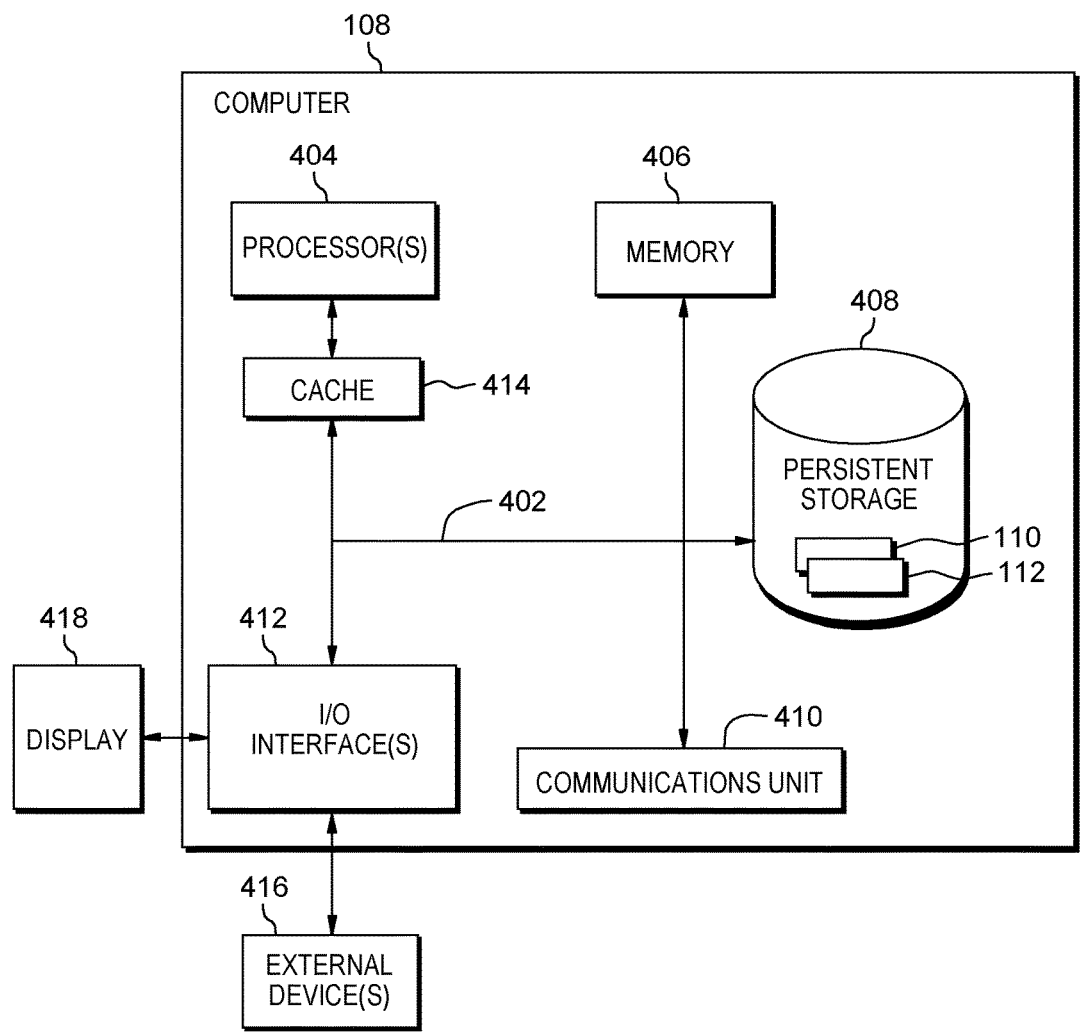
FIG. 4 depicts a block diagram of components of the server computer executing the self-assembly program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., self-assembly program 110 and database 112, are stored in persistent storage 408 for execution and/or access by one or more of the respective processor(s) 404 of server computer 108 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of self-assembling robot 104. In these examples, communications unit 410 includes one or more network interface cards. Communications unit 410 may provide communications through the use of either or both physical and wireless communications links. Self-assembly program 110, database 112, and other programs and data used for implementation of the present invention, may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., self-assembly program 110 and database 112 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, the method comprising:
    identifying, by the one or more computer processors, one or more triggering events;
    receiving, by one or more computer processors, one or more configuration parameters for one or more assembly plans pertaining to the one or more triggering events;
    analyzing, by the one or more computer processors, the one or more configuration parameters to determine configuration parameters based upon the identified one or more triggering events;
    creating, by the one or more computer processors, the one or more assembly plans containing one or more instructions for one or more self-assembling robots based on the determined necessary configuration parameters; and
    sending, by the one or more computer processors, the one or more assembly plans to the one or more self-assembling robots.

2. The method of claim 1, wherein the one or more configuration parameters are selected from a group consisting of: global positioning coordinates, robot data, topography data, wind speed data, weather forecasts, task data, and one or more standard disaster mitigation protocols.

3. The method of claim 2, wherein the one or more standard disaster mitigation protocols is selected from a group consisting of: fire disaster mitigation protocols and shelter-based disaster mitigation protocols.

4. The method of claim 1, further comprising:
    verifying, by the one or more computer processors, receipt of the one or more assembly plans by the one or more self-assembling robots; and
    determining, by the one or more computer processors, whether the one or more self-assembling robots achieved one or more correct configurations.

5. The method of claim 4, wherein determining whether the one or more self-assembling robots achieved the one or more correct configurations is determined using a threshold inquiry.

6. The method of claim 4, wherein determining whether the one or more self-assembling robots achieved the one or more correct configurations is determined by whether the one or more self-assembling robots achieved the one or more configurations meeting one or more standard disaster mitigation protocols.

7. The method of claim 4, further comprising:
    responsive to determining that the one or more self-assembling robots did not achieve the one or more correct configurations, creating, by the one or more computer processors, one or more modified assembly plans that include modified instructions for the one or more self-assembling robots.

8. The method of claim 7, wherein the one or more modified assembly plans are sent to a sub-group of self-assembling robots.

9. A computer program product, the computer program product comprising:
    one or more computer readable storage devices and program instructions stored on the one or more computer readable storage devices, the stored program instructions comprising:
    program instructions to identify one or more triggering events;
    program instructions to receive one or more configuration parameters for one or more assembly plans pertaining to the one or more triggering events;
    program instructions to analyze the one or more configuration parameters to determine necessary configuration parameters based upon the identified one or more triggering events;
    program instructions to create the one or more assembly plans containing one or more instructions for one or more self-assembling robots based on the determined necessary configuration parameters; and
    program instructions to send the one or more assembly plans to one or more self-assembling robots.

10. The computer program product of claim 9, wherein the one or more configuration parameters are selected from a group consisting of: global positioning coordinates, robot data, topography data, wind speed data, weather forecasts, task data, and one or more standard disaster mitigation protocols.

11. The computer program product of claim 10, wherein the one or more standard disaster mitigation protocols is selected from a group consisting of: fire disaster mitigation protocols and shelter-based disaster mitigation protocols.

12. The computer program product of claim 9, further comprising:
    program instructions to verify receipt of the one or more assembly plans by the one or more self-assembling robots; and
    program instructions to determine whether the one or more self-assembling robots achieved one or more correct configurations.

13. The computer program product of claim 12, wherein determining whether the one or more self-assembling robots achieved the one or more correct configurations is determined using a threshold inquiry.

14. The computer program product of claim 12, wherein determining whether the one or more self-assembling robots achieved the one or more correct configurations is determined by whether one or more self-assembling robots achieved one or more configurations meeting one or more standard disaster mitigation protocols.

15. The computer program product of claim 12, further comprising:
responsive to determining that the one or more self-assembling robots did not achieve the one or more correct configurations, program instructions to create one or more modified assembly plans that include modified instructions for the one or more self-assembling robots.

16. The computer program product of claim 15, wherein the one or more modified assembly plans are sent to a sub-group of self-assembling robots.

17. A computer system, the computer system comprising:
one or more computer processors;
one or more computer readable storage devices;
program instructions stored on the one or more computer readable storage devices for execution by at least one of the one or more computer processors, the stored program instructions comprising:
program instructions to identify one or more triggering events;
program instructions to receive one or more configuration parameters for one or more assembly plans pertaining to the one or more triggering events;
program instructions to analyze the one or more configuration parameters to determine necessary configuration parameters based upon the identified one or more triggering events;
program instructions to create the one or more assembly plans containing one or more instructions for one or more self-assembling robots based on the determined necessary configuration parameters; and
program instructions to send the one or more assembly plans to one or more self-assembling robots.

18. The computer system of claim 17, further comprising:
program instructions to verify receipt of the one or more assembly plans by the one or more self-assembling robots; and
program instructions to determine whether the one or more self-assembling robots achieved one or more correct configurations.

19. The computer system of claim 18, wherein determining whether the one or more self-assembling robots achieved the one or more correct configurations is determined by whether one or more self-assembling robots achieved one or more configurations meeting one or more standard disaster mitigation protocols.

20. The computer system of claim 18, further comprising:
responsive to determining that the one or more self-assembling robots did not achieve the one or more correct configurations, program instructions to create one or more modified assembly plans that include modified instructions for the one or more self-assembling robots.

* * * * *